United States Patent
Bunch et al.

(10) Patent No.: US 9,188,700 B2
(45) Date of Patent: Nov. 17, 2015

(54) SYSTEM AND METHOD TO IDENTIFY REGIONS OF AIRSPACE HAVING ICE CRYSTALS USING AN ONBOARD WEATHER RADAR SYSTEM

(75) Inventors: Brian P. Bunch, Snohomish, WA (US); Paul Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 618 days.

(21) Appl. No.: 13/535,230

(22) Filed: Jun. 27, 2012

(65) Prior Publication Data

US 2013/0234884 A1   Sep. 12, 2013

Related U.S. Application Data

(60) Provisional application No. 61/608,562, filed on Mar. 8, 2012.

(51) Int. Cl.
| | |
|---|---|
| *G01S 13/00* | (2006.01) |
| *G01W 1/00* | (2006.01) |
| *G01S 13/95* | (2006.01) |
| *G01S 7/06* | (2006.01) |
| *G01W 1/08* | (2006.01) |
| *B64D 15/20* | (2006.01) |

(52) U.S. Cl.
CPC .............. *G01W 1/00* (2013.01); *G01S 7/062* (2013.01); *G01S 13/953* (2013.01); *B64D 15/20* (2013.01); *G01W 1/08* (2013.01)

(58) Field of Classification Search
CPC .......... B64D 15/20; G01W 1/08; G01W 1/00; G01S 7/062; G01S 13/953
USPC .................................................. 342/26, 26 B
See application file for complete search history.

(56) References Cited

U.S. PATENT DOCUMENTS

| | | |
|---|---|---|
| 5,028,929 A | 7/1991 | Sand et al. |
| 6,377,202 B1 | 4/2002 | Kropfli et al. |
| 6,424,288 B1 | 7/2002 | Woodell |
| 6,549,161 B1 * | 4/2003 | Woodell ...................... 342/26 R |
| 6,707,415 B1 | 3/2004 | Christianson |
| 6,819,265 B2 | 11/2004 | Jamieson et al. |
| 7,109,913 B1 | 9/2006 | Paramore et al. |
| 7,132,974 B1 | 11/2006 | Christianson |
| 7,417,578 B1 | 8/2008 | Woodell et al. |

(Continued)

OTHER PUBLICATIONS

Mengistu Wolde et al., Polarimetric Signatures from Ice Crystals Observed at 95 GHz in Winter Clouds. Part I: Dependence on Crystal Form; Department of Atmospheric Science, University of Wyoming, Laramie, WY 82070, Submitted to the Journal of the Atmospheric Sciences Second Revision, Jul. 7, 2000, 30 pages.

*Primary Examiner* — Frank J McGue
(74) *Attorney, Agent, or Firm* — Shumaker & Sieffert, P.A.

(57) ABSTRACT

Systems and methods of detecting type I ice crystals using an aircraft's onboard weather radar system are disclosed. An exemplary embodiment identifies radar returns having a return level signal strength less than a radar return sensitivity threshold level, determines if at least one of a weather condition and a flight condition concurrently exists with the identified radar returns having the return level signal strength less than the radar return sensitivity threshold level, and identifies a region of airspace potentially having type I ice crystals when the at least one of the weather condition and the flight condition concurrently exists with the identified radar returns having the return level signal strength less than the radar return sensitivity threshold level.

20 Claims, 4 Drawing Sheets

(56) References Cited

U.S. PATENT DOCUMENTS

| | | |
|---|---|---|
| 7,845,221 B2 | 12/2010 | Severson et al. |
| 7,984,647 B2 | 7/2011 | Severson et al. |
| 7,986,408 B2 | 7/2011 | Ray et al. |
| 8,068,050 B2 | 11/2011 | Christianson |
| 2010/0110431 A1 | 5/2010 | Ray et al. |
| 2011/0019188 A1 | 1/2011 | Ray et al. |

* cited by examiner

SYSTEM AND METHOD TO IDENTIFY REGIONS OF AIRSPACE HAVING ICE CRYSTALS USING AN ONBOARD WEATHER RADAR SYSTEM

PRIORITY CLAIM

This application claims priority to Provisional Patent Application Ser. No. 61/608,562 filed on Mar. 8, 2012 and is incorporated herein by reference.

BACKGROUND OF THE INVENTION

High altitude ice crystals that are not visible to the crew of an aircraft, especially at night, may present a hazard to the aircraft passing through an airspace region having high concentrations of the ice crystals. Such ice crystals, which may be encountered while flying through clouds, may cause power loss in a jet engine or even engine damage. Power loss may include engine instability, power surge, power rollback, stalling, and/or flameout.

These non-visible ice crystals may be found at altitudes between 9,000 and 40,000 feet, when the ambient temperature is between −5° C. to −55° C. High altitude ice crystals are typically associated with convective cloud formations, such as isolated cumulonimbus cloud formations, thunderstorms, or even tropical squall lines. Such convective cloud formations can contain areas of strong updrafts. The strong updrafts in the convective weather can lift liquid water thousands of feet into the atmosphere, and thus form ice crystals.

Regions of airspace having non-visible ice crystals may be at altitudes that are significantly higher than the visible tops of the convective cloud formations which formed the ice crystals. Further, high altitude winds may blow the ice crystals away from the convective cloud formations. Accordingly, regions of airspace having large concentrations of ice crystals may be encountered far above and/or away from the vicinity of the convective cloud formations which formed the ice crystals. Further, such airspace regions may have little to no turbulence to provide a warning indication to the crew of an aircraft as it flies into an airspace region with high concentrations of ice crystals.

Because of the very small size of the ice crystals, which may be as small as 40 microns, the ice crystals are not visibly detectable by the aircraft crew. Thus, the crew may not be aware that their aircraft is travelling through an airspace region having a high concentration of ice crystals, particularly if there is no turbulence and/or if the airspace region is not near any convective cloud formations.

Further, conventional aircraft weather radar systems are typically not configured to detect ice crystals since the reflectivity levels of return echoes from the ice crystals and/or the associated cloud cover, which may be in the range of 0-20 decibels (dBZ), is below the radar return sensitivity threshold levels, typically set at or about 20 dBZ. The aircraft weather radar systems are configured to detect larger water particles, such as rain, hail, and/or snow since these larger water particles provide radar reflectivity signal strength return levels that are discernable by the aircraft weather radar systems since such radar reflectivity signal strength return levels exceed the minimum radar return sensitivity threshold levels of approximately 20 dBZ. Low level radar reflectivity signal strength return levels that are less than a radar return sensitivity threshold level are typically ignored to reduce the amount of information presented on the radar system display. That is, since low levels of precipitation are typically not dangerous to aircraft, and since regions with low levels of precipitation exhibit low radar reflectivity signal strength return levels below the 20 dBZ threshold, such regions of low levels of precipitation are typically not indicated on the radar system display to avoid distracting the aircraft crew. Accordingly, the presence of ice crystals are not indicated on the radar system display because of their low radar reflectivity signal strength return levels.

Accordingly, there is a need in the arts to provide the crew of an aircraft information indicating the location of regions of airspace that are likely to have ice crystals so that the crew may then avoid airspace having potentially high concentrations of ice crystals.

SUMMARY OF THE INVENTION

An exemplary embodiment of a type I ice crystal display system identifies type I ice crystals using an aircraft's onboard weather radar system. An exemplary embodiment identifies radar returns having a return level signal strength less than a radar return sensitivity threshold level, determines if at least one of a weather condition and a flight condition concurrently exists with the identified radar returns having the return level signal strength less than the radar return sensitivity threshold level, and identifies a region of airspace potentially having type I ice crystals when the at least one of the weather condition and the flight condition concurrently exists with the identified radar returns having the return level signal strength less than the radar return sensitivity threshold level.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
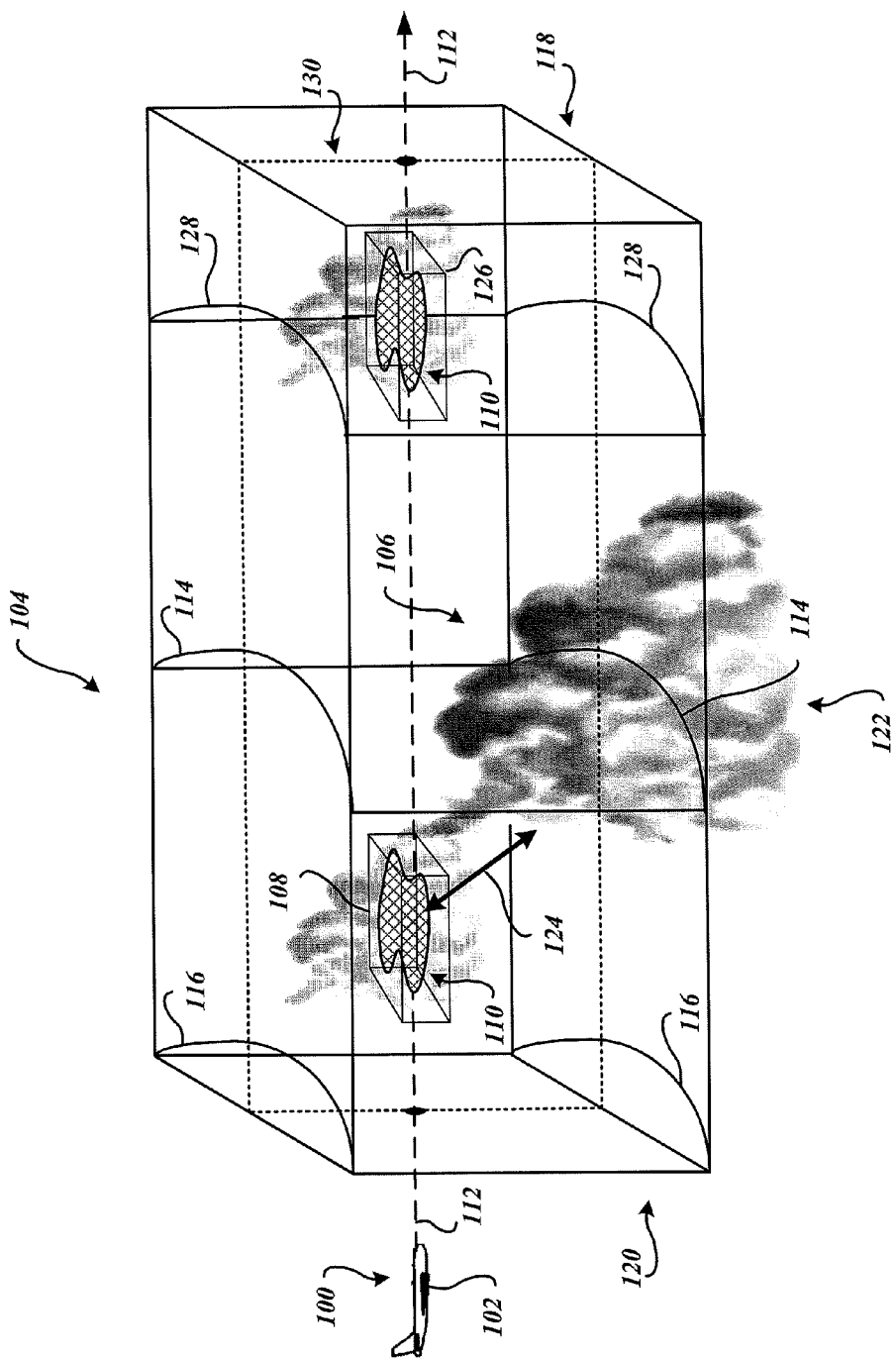
FIG. 1 is a perspective view of a portion of a planned flight path of an aircraft traveling through a region of airspace having a convective storm cell and a region of airspace with type I crystals.

FIG. 1 is a perspective view of a portion of a planned flight path of an aircraft 102 traveling through a region of airspace 104 having convective cloud weather 106 and traveling through a region of airspace 108 with type I crystals 110. The aircraft includes an onboard weather radar system with an embodiment of a type I ice crystal display system 100. For clarity, ice crystals are defined as either type I ice crystals or type II ice crystals herein.

Type I ice crystals are defined herein as ice crystals typically found at altitudes between 9,000 and 40,000 feet, and/or when the ambient temperature is between −5° C. to −55° C. These high altitude type I ice crystals are associated with the convective cloud weather 106. Type I ice crystals are often not visible to the crew of the aircraft 102, and may be encountered while flying through relatively light cloud cover. Type I ice crystals are not associated with liquid water droplets. That is, liquid water droplets are not present with type I ice crystals. Accordingly, type I ice crystals do not cause significant icing on aircraft surfaces, such as the aircraft wings. Rather, type I ice crystals may cause potential engine failure or power loss. Reflectivity levels of weather radar return echoes from type I ice crystals are generally in the range of 10-20 decibels (dBZ), which is below the radar return sensitivity threshold levels of an onboard weather radar system, typically set at or about 20 dBZ.

Type II ice crystals, in contrast, are often found with and are associated with liquid water droplets in the convective cloud weather 106. Under certain conditions, type II ice crystals and the associated liquid water droplets may cause hazardous icing on aircraft surfaces, such as the aircraft wings. The region of airspace associated with type II ice crystals and the associated liquid water droplets often will exhibit reflectivity levels of weather radar return echoes that are greater than that of the type I ice crystals, and may often exceed the 20 dBZ radar return sensitivity threshold level of the onboard weather radar system. Even if the reflectivity signal strength returns from regions of airspace having high concentrations of the type II ice crystals and liquid water is less than the display threshold of reflectivity signal strength returns of the onboard weather radar system, the detection and/or notification of the crew of the aircraft 102 is not the primary interest of embodiments of the type I ice crystal display system 100. That is, embodiments of the type I ice crystal display system 100 are primarily concerned with the detection and the attendant crew notification of regions of airspace 108 having type I ice crystals 110 which may cause engine failure or loss of power, and not necessarily detection and notification for type II ice crystals that may cause icing conditions of the surface of the aircraft 102.

Embodiments of the type I ice crystal display system 100 may be configured to receive input from an altitude detector, which may be a sensor or other altitude determination system (not shown). The altitude detector provides information corresponding to the aircraft's altitude. The altitude of the aircraft 102 may correspond to a region of airspace 108 that is likely to have type I ice crystals 110. The altitude may be referenced to sea level or a height above ground. Any suitable altitude detector may be used. The information provided by the altitude detector may be directly provided to the onboard weather radar system and/or the type I ice crystal display system 100, and/or may be provided via other intermediary systems which are receiving and/or determining the altitude information Example embodiments of the type I ice crystal display system 100 may be configured to receive input from an ambient air temperature detector, which may be a sensor or other temperature determination system (not shown). Alternatively, or additionally, embodiments may be configured to estimate temperature at the altitude and/or location of the region of airspace 108 that may have the type I crystals 110. The ambient air temperature detector provides information corresponding to the ambient air temperature outside of the aircraft. That is, the temperature that the aircraft 102 is currently flying through, and/or an estimated temperature of a region of airspace that is likely to have type I ice crystals, may be determined from information provided by the air temperature detector. The temperature may be referenced to degree Celsius or degrees Fahrenheit. Any suitable ambient air temperature detector may be used. The information provided by the ambient air temperature detector may be directly provided to the onboard weather radar system and/or the type I ice crystal display system 100, and/or may be provided via other intermediary systems which are receiving and/or are determining the temperature information.

Additionally, embodiments of the type I ice crystal display system 100 may be configured to receive radar reflectivity signal strength return information from the onboard weather radar system. The type I ice crystal display system 100 monitors for low level reflectivity signal strength returns received by the onboard weather radar system. Such low level reflectivity signal strength returns may be indicative of the region of airspace 108 having type I ice crystals 110, particularly if other weather conditions and/or flight conditions concurrently exist.

Type I ice crystals and any associated cloud cover are known to provide low level reflectivity signal strength returns, which are typically below a radar reflectivity display threshold which defines a minimum level of reflectivity signal strength returns that are displayed by the onboard weather radar system. For example, the onboard weather radar system may have a radar reflectivity display threshold set at 20 dBZ. (However, the radar reflectivity display threshold of reflectivity signal strength returns may be set at any level of interest.) When the onboard weather radar system detects reflectivity signal strength returns above the radar reflectivity display threshold, the onboard weather radar system determines that weather or ground objects have been detected. Accordingly, a display of the onboard weather radar system presents the information to the crew of the aircraft 102. Severity of the detected weather may be indicated on the display using different colors, such as yellow for weaker strength weather, or red for more severe strength weather.

When low level reflectivity signal strength returns are detected by the onboard weather radar system concurrently with one or more other weather conditions and/or flight conditions, the type I ice crystal display system 100 may identify a region of airspace 108 potentially having type I ice crystals 110. In response to determining that there is a likelihood of the presence of a region of airspace having a high concentration of type I ice crystals, the embodiments of the type I ice crystal display system 100 notify or otherwise advise the crew of the aircraft 102. Accordingly, the crew may change the flight path 112 of the aircraft 102 to avoid the identified region of airspace 108 potentially having type I ice crystals 110.

Accordingly, embodiments of the type I ice crystal display system 100 assess the likelihood that a region of airspace may potentially have type I ice crystals when the radar returns from that region of airspace are less than a predefined reflectivity display threshold value or a range of the radar reflectivity display threshold values. For example, an embodiment may monitor for reflectivity signal strength returns of less than the radar reflectivity display threshold, such as 20 dBZ.

Alternatively, an embodiment may monitor for reflectivity signal strength returns of less than another predefined value that may be less than, or even greater than, the radar reflectivity display threshold. For example, but not limited to, an embodiment may monitor for reflectivity signal strength returns that are less than 10 dBZ.

Alternatively, an embodiment may monitor for reflectivity signal strength returns of less than the radar reflectivity display threshold (or another predefined value) and that are greater than a predefined minimum value. For example, but not limited to, an embodiment may monitor for reflectivity signal strength returns in a range between 5 dBA and 10 dBZ.

As noted above, when one or more weather conditions and/or flight conditions concurrently occur along with the detection low level reflectivity signal strength returns by the onboard weather radar system, embodiments of the type I ice crystal display system 100 may determine that type I ice crystals may be present in the associated region of airspace. These weather conditions and/or flight conditions include:

- a location of a region of airspace 108 from which the low level reflectivity signal strength returns originated being less than or equal to a maximum range threshold 114 from the aircraft 102;
- a location of a region of airspace 108 from which the low level reflectivity signal strength returns originated being less than or equal to a minimum range threshold 116 from the aircraft 102;
- an ambient air temperature being less than or equal to an ambient air temperature threshold;
- an altitude of the aircraft 102 being greater than or equal to an aircraft altitude threshold 118;
- an altitude of a region of airspace 108 from which the low level reflectivity signal strength returns originated being greater than or equal to a type I ice crystal altitude threshold 120;
- a distance between a region of airspace 108 from which the low level reflectivity signal strength returns originated and detected convective weather 122 being less than or equal to a convective weather proximity threshold 124;
- a size of detected convective weather 122 being greater than or equal to a convective weather size threshold;
- an intensity of detected convective weather 122 being greater than or equal to a convective weather intensity threshold; and
- a vertically integrated liquid-water (VIL) content value being greater than or equal to a VIL content value threshold.

As noted above, a weather condition that may be considered concurrently with the above-described detection low level reflectivity signal strength returns by the onboard weather radar system is the range of the region of airspace (distance from the aircraft 102) from which the low level reflectivity signal strength returns originated. If the location of the region of airspace from which the low level reflectivity signal strength returns originated is less than or equal to a maximum range threshold 114 from the aircraft 102, embodiments of the type I ice crystal display system 100 may identify a region of airspace 108 potentially having type I ice crystals 110. The identified region of airspace 108 with low level reflectivity signal strength returns and potentially having type I ice crystals is then indicated to the crew of the aircraft 102.

It is appreciated that when weather or other structure reflects incident radar signals, the reflected radar signal portion that is returning towards the aircraft disperses. This phenomenon is commonly referred to as "space loss" in the arts. Accordingly, relatively intense weather may initially reflect incident radar signals at a strength that exceeds 20 dBZ. However, if such weather is relatively far away from the aircraft 102, the reflectivity signal strength returns originating from the relatively far away weather that are eventually detected by the onboard weather radar system may have decreased below 20 dBZ radar reflectivity display threshold. If such weather had been at a closer range to the aircraft 102, then the detected reflectivity signal strength returns would have been in excess of the radar reflectivity display threshold, and accordingly, would have been indicated on the display of the onboard weather radar system.

In contrast, if the low level reflectivity signal strength returns originate from a region of airspace that is at a relatively close to the aircraft 102, it is likely that such returns may be due to either reflectivity signal strength returns from very light precipitation, light cloud cover, and/or type I ice crystals. Accordingly, regions of airspace associated with the low level reflectivity signal strength returns must be within a maximum range threshold 114 of the aircraft 102 to be considered as a region of airspace 108 of interest potentially having type I ice crystals 110. In an exemplary embodiment, the maximum range threshold 114 is 20 miles. Other embodiments may use any suitable maximum range threshold 114 value. For example, but not limited to, if the region of airspace associated with the low level reflectivity signal strength returns is at a range of 15 miles out from the aircraft 102, then the type I ice crystal display system 100 may determine that that particular region of airspace may have type I ice crystals.

Further, some embodiments may automatically adjust the maximum range threshold 114 based on various weather conditions and/or flight conditions. Alternatively, or additionally, the maximum range threshold 114 may be manually adjusted by the crew of the aircraft 102. For example, but not limited to, if the sky is generally clear of convective weather, the maximum range threshold 114 may be adjusted to a first range. On the other hand, if convective weather is close to the aircraft, the maximum range threshold 114 may be adjusted to a second range. In an example embodiment, if the sky is clear and convective weather is not proximate to the aircraft 102, the first maximum range threshold 114 may be set to 40 miles. When convective weather is proximate to the aircraft 102, then the maximum range threshold 114 may be adjusted to 20 miles.

Additionally, or alternatively, a minimum range threshold 116 may be employed by embodiments of the type I ice crystal display system 100. If low level reflectivity signal strength returns originate from a region of airspace that is less than or equal to the minimum range threshold 116, such low level reflectivity signal strength returns are disregarded, and accordingly, are not indicated to the crew of the aircraft 102. For example, but not limited to, a minimum range threshold 116 of 5 miles may be employed. In this simplified example, if a region of airspace originating the low level reflectivity signal strength returns is detected at a 4 mile range, it may not be possible for the crew to adjust the flight path 112 in time to avoid that region of airspace. Accordingly, that region of airspace 108 potentially having type I ice crystals 110 may not be indicated to the crew. (However, regions of airspace 108 potentially having type I ice crystals 110 at a range of 5 miles or more are of interest and would be indicated to the crew.)

Alternatively, when a region of airspace 108 originating the low level reflectivity signal strength returns is detected that is at a range that is less than or equal to the minimum range threshold 116, the region of airspace 108 may be indicated to the crew with a heightened level of awareness. For example, but not limited to, an audible alarm or warning may be issued. Alternatively, or additionally, the region of airspace 108 may be indicated on the weather radar display with a color associated with a heightened awareness color, with flashing, or the like. For example, but not limited to, the region of airspace 108 potentially having type I ice crystals may be indicated using a magenta color or other color that the standardized red/yellow/green colors used by legacy weather radar display systems. Alternatively, or additionally, a special pattern or fill (such as, but not limited to, a paisley pattern) may be used to indicate the region of airspace 108 potentially having type I ice crystals. In other embodiments, the reflectivity threshold applicable to regions indicated using a green display color may be lowered below the normal operating/display threshold. Accordingly, the crew of the aircraft 102 may appreciate that a potential engine failure or power loss may be imminent in view of a possible incursion into the region of airspace 108 potentially having type I ice crystals, and therefore, may provide the crew with a period of time to prepare for or take remedial actions.

Another weather condition that may be considered concurrently with the low level reflectivity signal strength returns detected by the onboard weather radar system is the ambient temperature. If the ambient temperature is greater than or equal to an ambient air temperature threshold, type I ice crystals will not likely be present. If the ambient air temperature is less than or equal to the ambient air temperature threshold, then type I ice crystals may be present. Accordingly, if a region of airspace 108 with low level reflectivity signal strength returns is detected and the ambient temperature is less than or equal to the ambient air temperature threshold, then embodiments of the type I ice crystal display system 100 may determine that type I ice crystals may be present in the associated region of airspace 108. In an example embodiment, the ambient air temperature threshold is −40° C. Any suitable ambient air temperature threshold may be used.

In addition to sensing ambient temperature outside of the aircraft 104, some embodiments may optionally, or additionally, estimate an ambient temperature for an identified region of airspace 108 with low level reflectivity signal strength returns. For example, an ambient temperature-altitude gradient estimation may be used to estimate ambient temperature, particularly when the altitude of the aircraft 102 is different from the altitude of the region of airspace 108 with low level reflectivity signal strength returns.

Alternatively, or additionally, information pertaining to temperature at the altitude and/or location of the region of airspace 108 potentially having type I ice crystals may be obtained from other sources. For example, but not limited to, temperature information may be received from other aircraft. Alternatively, or additionally, temperature information may be received from a groundstation or other terrestrial source.

In an example embodiment, the ambient temperature-altitude gradient may be a standardized or predefined curvilinear function (such as a straight or a curved line). In some embodiments, the intercept of the ambient temperature-altitude gradient may be adjustable based on the current ambient temperature about the aircraft 102. In some embodiments, the ambient temperature-altitude gradient may be learned. For example, the ambient temperature-altitude gradient may be learned if the aircraft 102 has changed altitudes and detected ambient temperatures about the aircraft 102 at various altitudes has been saved. Thus, a slope and/or an intercept of the ambient temperature-altitude gradient may be determined based on actual ambient temperature data.

Another flight condition that may be considered concurrently with the low level reflectivity signal strength returns detected by the onboard weather radar system is an aircraft altitude threshold 118. If the current altitude of the aircraft 102 is greater than or equal to the aircraft altitude threshold 118, then embodiments of the type I ice crystal display system 100 may determine that type I ice crystals may be present in the associated region of airspace 108. An noted above, an altitude detector may provide a current altitude of the aircraft 102. In an example embodiment, the aircraft altitude threshold may be 9,000 feet above sea level, though any aircraft altitude threshold 118 may be used. Further, the altitude threshold 118 may be adjustable to account for other weather conditions and/or flight conditions. For example, but not limited to, a first aircraft altitude threshold 118 may be used when the aircraft 102 is flying over an ocean, and a second aircraft altitude threshold 118 may be used when the aircraft 102 is flying over mountains.

Another weather condition that may be considered concurrently with the low level reflectivity signal strength returns detected by the onboard weather radar system is a type I ice crystal altitude threshold 120. Altitude of the region of airspace 108 associated with the low level reflectivity signal strength returns may be computed based upon a range and elevation as determined by the onboard weather radar system with respect to the current altitude of the aircraft 102. In an example embodiment, a type I ice crystal altitude threshold may be 9,000 feet above sea level, though any type I ice crystal altitude threshold 120 may be used. Further, the type I ice crystal altitude threshold 120 may be adjustable to account for other conditions. For example, but not limited to, a first type I ice crystal altitude threshold 120 may be used when the region of airspace 108 potentially having type I ice crystals 110 is over an ocean, and a second type I ice crystal altitude threshold 120 may be used when the region of airspace 108 potentially having type I ice crystals 110 is over mountains. The type I ice crystal altitude threshold 120 may be the same as, or may be different from, the aircraft altitude threshold 118 depending upon the embodiment, and/or based upon particular weather conditions and/or flight conditions.

Another weather condition that may be considered concurrently with the low level reflectivity signal strength returns detected by the onboard weather radar system is a convective weather proximity threshold 124. Type I ice crystals may be present when convective weather 122 is nearby since type I ice crystals are typically generated by liquid water droplets that freeze as they are up drafted from the convective weather 122. Accordingly, the type I ice crystal display system 100 may optionally monitor for convective weather 122 (that has reflectivity signal strength returns which are greater than the above-described radar reflectivity display threshold).

The convective weather proximity threshold 124 corresponds to a determined distance between the convective weather 122 and the region of airspace 108 potentially having type I ice crystals 110. A distance of the convective weather 122 from the aircraft 102 may be determined based on a range (distance from the aircraft 102) of reflectivity signal strength returns detected by the onboard radar system. Similarly, a range of the region of airspace 108 potentially having type I ice crystals 110 may be determined based on a range of detected reflectivity signal strength returns. As separation distance between the convective weather 122 and the region of airspace 108 potentially having type I ice crystals 110 may be determined based on the differences in determined ranges of the convective weather 122 and the region of airspace 108. Elevations of the aircraft 102, the convective weather 122, and/or the region of airspace 108 may also be considered in determining the separation distance between the convective weather 122 and the region of airspace 108 potentially having type I ice crystals 110.

If the separation distance between the region of airspace 108 potentially having type I ice crystals 110 and the convective weather 122 is within the convective weather proximity threshold 124, then embodiments of the type I ice crystal display system 100 may determine that it is likely that type I ice crystals may be present in the associated region of airspace 108. For example, but not limited to, if the region of airspace 108 from which the low level reflectivity signal strength returns originated is adjacent to and/or is directly above the detected convective weather 122, then it is likely that type I ice crystals are present in the associated region of airspace 108. On the other hand, if the region of airspace 108 from which the low level reflectivity signal strength returns originated is 500 miles away from the detected convective weather 122, then it may not be likely that type I ice crystals are present in the associated region of airspace 108.

However, it is appreciated that prevailing winds may blow a region of airspace 108 having type I ice crystals 110 a relatively long distance from convective weather 122 which generated the type I ice crystals 110. Accordingly, an example embodiment may have the convective weather proximity threshold set to 100 miles, though any suitable convective weather proximity threshold 124 may be used. Further, the convective weather proximity threshold 124 may be adjustable to account for other weather conditions and/or flight conditions. For example, but not limited to, if prevailing winds are known to be relatively high, the convective weather proximity threshold 124 may be increased. Similarly, if prevailing winds are known to be relatively low, the convective weather proximity threshold 124 may be decreased.

Another weather condition that may be considered concurrently with the low level reflectivity signal strength returns detected by the onboard weather radar system is a convective weather size threshold. Type I ice crystals 110 may be present when a very large-sized convective weather formation 122 is present. On the other hand, a relatively small and/or isolated convective weather formation may not be expected to generate a significant amount of type I ice crystals 110. Accordingly, the type I ice crystal display system 100 may optionally monitor the scope of reflectivity signal strength returns to determine the size of any detected convective weather 122. If the size of the convective weather 122 is greater than or equal to the convective weather size threshold, then the type I ice crystal display system 100 may determine that it is likely that type I ice crystals 110 may be present in the associated region of airspace 108. On the other hand, if the detected convective weather 122 is small and/or is isolated, then it is likely that a hazardous level of type I ice crystals 110 is not present in the associated region of airspace 108. Any suitable convective weather size threshold may be used. The convective weather size threshold may be based on the height, width, estimated vertically integrated liquid, and/or volume of the detected convective weather 122.

Another weather condition that may be considered concurrently with the low level reflectivity signal strength returns detected by the onboard weather radar system is a convective weather intensity threshold. More intense (severe) convective weather 122 is more likely to generate a hazardous concentration of type I ice crystals 110 than less severe convective weather 122. Accordingly, the type I ice crystal display system 100 may optionally monitor the values of reflectivity signal strength returns to determine the severity (intensity) of any detected convective weather 122. If the intensity of the convective weather 122 is greater than or equal to the convective weather intensity threshold, then the type I ice crystal display system 100 may determine that it is likely that type I ice crystals 110 may be present in the associated region of airspace 108. Any suitable value for the convective weather intensity threshold may be used. Further, the value of the convective weather intensity threshold may be adjustable to account for other weather conditions and/or flight conditions. For example, but not limited to, a first convective weather intensity threshold may be used for a particular season and/or a particular geographic area. A second convective weather intensity threshold may be used for a different season and/or a different geographic area.

Further, the volume or size of portions of the convective weather 122 exceeding the convective weather intensity threshold may be considered. For example, similar sized convective weather 122 may exhibit different sizes or volumes of severe weather. Convective weather 122 having a relatively larger volume or size of severe weather may be more likely to generate hazardous high concentrations of type I ice crystals 110. Accordingly, embodiments may compare the detected convective weather 122 with a minimum volume or size of convective weather having a particular level of severity threshold (hereinafter the "volume/severity threshold"). In the volume or size of a portion of the detected convective weather 122 is greater than or equal to the volume/severity threshold, then the type I ice crystal display system 100 may determine that it is likely that type I ice crystals 110 may be present in the associated region of airspace 108.

Another weather condition that may be considered concurrently with the low level reflectivity signal strength returns detected by the onboard weather radar system is the VIL content value of detected convective weather. The VIL content value indicate the amount of water (or precipitation) in a volume of space, which is typically a column. The VIL content value may be determined from radar returns that are analyzed in terms of three-dimensional (3-D) space. In some situations, the location of the volume of airspace 108 may be spatially removed or separated from the volume of space for which the VIL content value is determined.

If the VIL content value for a particular volume of space is greater than or equal to a VIL content value threshold, type I ice crystals may be present. If the VIL content value is less than or equal to the VIL content value threshold, then type I ice crystals may not be present in the region of airspace 108. Accordingly, if a region of airspace 108 with low level reflectivity signal strength returns is detected, and at least one volume of space with a VIL content value is greater than or equal to the VIL content value threshold, then embodiments of the type I ice crystal display system 100 may determine that type I ice crystals may be present in the associated region of airspace 108. Any suitable VIL content value threshold may be used.

Further, location of those columns of space with a determinable VIL content value may be considered when the column of space is within a predetermined range of the aircraft 102. For example, if a location of a column of space with a VIL content value (exceeding the VIL content value threshold) is identified at a 5 mile range from the aircraft 102, that particular column may be considered as indicating that the region of airspace 108 potentially has type I ice crystals 110. On the other hand, if the column of space with a VIL content value (exceeding the VIL content value threshold) is identified at a 500 mile range, then that particular column may not be considered as indicating that the region of airspace 108 potentially has type I ice crystals 110. This range from the aircraft 102 is referred to herein as a VIL content value range threshold. Any suitable VIL content value range threshold may be used by the various embodiments. Further, the VIL content value range threshold may be adjustable by the crew of the aircraft 102, and/or may be automatically adjustable based on other detected flight conditions. For example, the VIL content value range threshold may be adjustable based on an ambient temperature, terrain conditions, seasonal conditions, or the like.

Alternatively, or additionally, location of those columns of space with a determinable VIL content value may be considered when the column of space is within a predetermined range of the associated region of airspace 108. For example, if a location of a column of space with a VIL content value (exceeding the VIL content value threshold) is identified at a 1 mile range from the associated region of airspace 108, that particular column may be considered as indicating that the region of airspace 108 potentially has type I ice crystals 110. On the other hand, if the column of space with a VIL content value (exceeding the VIL content value threshold) is identified at a 10 mile range from the associated region of airspace 108, then that particular column may not be considered as indicating that the region of airspace 108 potentially has type I ice crystals 110. This range from the associated region of airspace 108 may also be referred to herein as a VIL content value range threshold. Any suitable VIL content value range threshold may be used by the various embodiments. Further, the VIL content value range threshold may be adjustable by the crew of the aircraft 102, and/or may be automatically adjustable based on other detected flight conditions. For example, the VIL content value range threshold may be adjustable based on an ambient temperature, terrain conditions, seasonal conditions, or the like.

FIG. 1 further illustrates a region of airspace 126 having type I ice crystals 110 therein at a range 128 out from the aircraft 102. In some situations, the region of airspace 126 with type I ice crystals 110 may not provide a detectable return due to space loss. That is, the radar returns from the type I ice crystals 110 in the region of airspace 126 may become so dispersed by the time that they reach the aircraft 102, that the radar returns may not be detectable by the onboard radar system.

In other situations, any detectable returns from the type I ice crystals 110 in the region of airspace 126 may be below a minimum radar reflectivity display threshold. The minimum radar reflectivity display threshold may be set to reduce nuisance alarms or to not display such region of airspace 126 that are so far removed from the aircraft 102 as to not constitute a significant hazard to the aircraft 102. Embodiments may optionally employ the minimum radar reflectivity display threshold. Any suitable value for the minimum radar reflectivity display threshold may be used, such as 5 dBZ.

Further, the range 128 of the region of airspace 126 is greater than the maximum range threshold 114. Accordingly, even if the region of airspace 126 having the type I ice crystals 110 is detected, embodiments of the type I ice crystal display system 100 may be configured to not alert the crew or otherwise display the region of airspace 126 on the display of the onboard weather radar system. The region of airspace 126 may not be displayed because it is too far away to be a credible hazard to the aircraft 102.

Summarizing, embodiments 100 the type I ice crystal display system 100 are configured to conditionally detect regions of airspace 108 potentially having type I ice crystals 110 based on a detected low reflectivity signal strength return values that are less than or equal to a radar reflectivity display threshold. If other weather and/or flight conditions exist concurrently with detection of a region of airspace 108 potentially having type I ice crystals 110, then the crew of the aircraft are alerted or warned, and/or the region of airspace 108 is indicated on a display of the onboard weather radar system. Examples of conditional testing wherein embodiments of the type I ice crystal display system 100 will identify regions of airspace 108 potentially having type I ice crystals 110, and then notify the crew with an audible alert or display, include but are not limited to:

1. Low Reflectivity signal strength returns conditionally tested with Ambient Temperature less than or equal to an ambient air temperature threshold.

2. Low Reflectivity signal strength returns conditionally tested with aircraft altitude greater than or equal to an aircraft altitude threshold 118.

3. Low Reflectivity signal strength returns conditionally tested with an altitude of the region of airspace 108 greater than or equal to a type I ice crystal altitude threshold 120.

4. Low Reflectivity signal strength returns conditionally tested with ambient temperature being less than or equal to an ambient air temperature threshold, and conditionally tested with range of the airspace 108 from the aircraft 102 being less than or equal to a maximum range threshold 114.

5. Low Reflectivity signal strength returns conditionally tested with the altitude of the aircraft 102 being greater than or equal to the aircraft altitude threshold 118, and conditionally tested with a range of the airspace 108 from the aircraft 102 being less than or equal to a maximum range threshold 114.

6. Low Reflectivity signal strength returns conditionally tested with the altitude of the region of airspace 108 being greater than or equal to a type I ice crystal altitude threshold 120, and conditionally tested with a range of the airspace 108 from the aircraft 102 being less than or equal to a maximum range threshold 114.

7. Low Reflectivity signal strength returns conditionally tested with ambient temperature being less than or equal to an ambient air temperature threshold, and conditionally tested with range of the airspace 108 from the aircraft 102 being greater than or equal to a minimum range threshold 116.

8. Low Reflectivity signal strength returns conditionally tested with the altitude of the aircraft 102 being greater than or equal to the aircraft altitude threshold 118, and conditionally tested with range of the airspace 108 from the aircraft 102 being greater than or equal to a minimum range threshold 116.

9. Low Reflectivity signal strength returns conditionally tested with altitude of the region of airspace 108 being greater than or equal to a type I ice crystal altitude threshold 120, and conditionally tested with range of the airspace 108 from the aircraft 102 being greater than or equal to a minimum range threshold 116.

10. Low Reflectivity signal strength returns conditionally tested with ambient temperature being less than or equal to an ambient air temperature threshold, and conditionally tested with a distance between the region of airspace 108 and the detected convective weather 122 being less than or equal to a convective weather proximity threshold 124.

11. Low Reflectivity signal strength returns conditionally tested with ambient temperature being less than or equal to an ambient air temperature threshold, and conditionally tested with at least one size characteristic of the convective weather 122 being greater than or equal to a convective weather size threshold.

12. Low Reflectivity signal strength returns conditionally tested with at least one proximate column of airspace having a VIL content being greater than or equal to a VIL content threshold, and optionally conditionally tested with a location of the column of airspace being location being at a range that is less than or equal to a VIL content range threshold.

The above described conditional testing performed by various embodiments of the type I ice crystal display system 100 are non-limiting examples. Embodiments may use any combination of, and any number of, conditional thresholds so as to reliably identify regions of airspace 108 potentially having type I ice crystals 110.

Other combinations of weather conditions and/or flight conditions may be used by alternative embodiments of the type I ice crystal display system 100 to conditionally detect region of airspace 108 potentially having type I ice crystals 110 based on a detected low reflectivity signal strength return values. All such variations are intended to be within the scope of this disclosure and protected by the accompanying claims.

Figure 2:
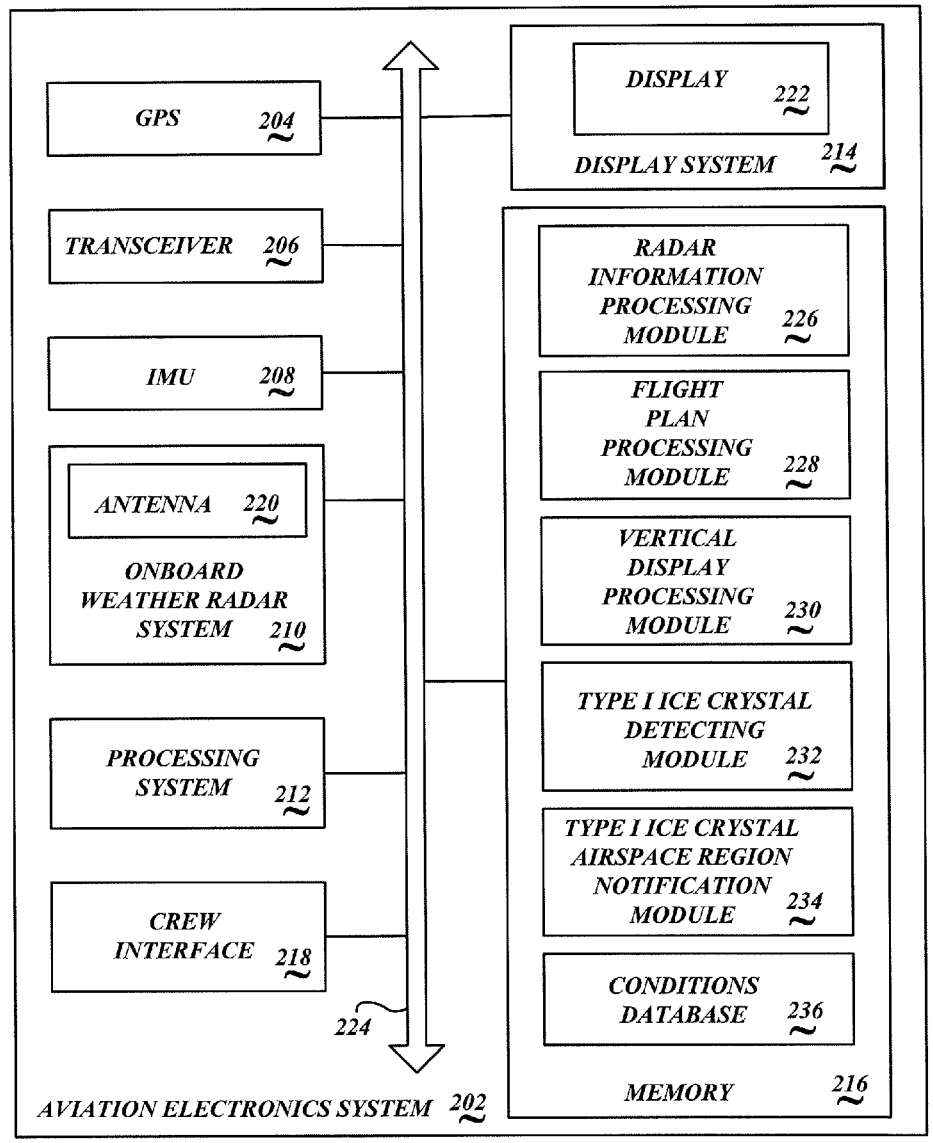
FIG. 2 is a block diagram of an embodiment of the type I ice crystal display system implemented in an aviation electronics system of the aircraft.

FIG. 2 is a block diagram of an embodiment of the type I ice crystal display system 100 implemented in an aviation electronics system 202 of the aircraft 102. The aviation electronics system 202 includes a global positioning system (GPS) 204, a transceiver 206, an inertial measurement unit (IMU) 208, an onboard weather radar system 210, a processing system 212, a display system 214, a memory 216, and a crew interface 218. The onboard weather radar system 210 includes an antenna 220 that is operable to emit radar signals and receive radar returns. The display system 214 includes a display 222. It is appreciated that the aviation electronics system 202 includes many other components and/or systems that are not illustrated or described herein.

The above-described components, in an exemplary embodiment, are communicatively coupled together via communication bus 224. In alternative embodiments of the aviation electronics system 202, the above-described components may be communicatively coupled to each other in a different manner. For example, one or more of the above-described components may be directly coupled to each other, or may be coupled to each other via intermediary components (not shown).

The radar system 210 may be any suitable onboard weather radar system, such as, but not limited to, a weather radar that is operable to detect weather that is located relatively far away from the aircraft 102. The antenna 220 is operable to emit radar pulses and to sense the signal strength of received radar returns. A radar return is reflected energy from an object, such as ice crystals and/or water droplets, upon which the emitted radar pulse is incident on. The antenna 220 is swept in a back-and-forth motion, in an up and down direction, and/or in other directions of interest, such that the radar system 210 is able to detect weather, and more particularly type I ice crystals 110, in an area of interest about the aircraft 102. Embodiments of the type I ice crystal display system 100 may be implemented in other types and/or applications of radar.

An exemplary embodiment of the type I ice crystal display system 100 comprises a plurality of cooperatively acting modules. The modules are identified as a radar information processing module 226, a flight plan processing module 228, an optional vertical display processing module 230, a type I ice crystals detecting module 232, and a type I ice crystals airspace region notification module 234. Modules 226, 228, 230, 232, 234 reside in the memory 216, and are retrieved and executed by the processing system 212. In an exemplary embodiment, a conditions database 236 is stored in memory 216. In other embodiments, the modules 226, 228, 230, 232, 234 may be implemented together as a common module, may be integrated into other modules, or reside in other memories (not shown). Further, the conditions database 236 may be implemented with other databases, may be implemented in various formats, such as a buffer or the like, and/or may be implemented in another memory.

The radar information processing module 226 processes information corresponding to the received radar returns detected by the antenna 220 of the onboard weather radar system 210. Various types of weather, and their associated attributes, are determined by the radar information processing module 226. More particularly, weather information is determined for the detected radar return levels. Selected determined weather information may be optionally saved into the corresponding voxels of 3-D weather information database (not shown).

Based on received radar returns, the radar information processing module 226 may optionally determine VIL content for columns of airspace in the region of airspace 104. VIL content may be determined for columns of airspace having any suitable volume, footprint area, and/or height. Any suitable method, process or apparatus may be employed by the various embodiments to determine VIL content.

The flight plan processing module 228 processes flight plan information. Flight plans may be predefined and/or entered by the crew. A predefined flight plan typically comprises a plurality of planned flight path segments based upon a series of waypoints. Planned flight path segments may be straight or curvilinear. An example flight path 112 is illustrated in FIG. 1. The flight plan information includes geographic location information that defines location of waypoints and/or the flight path segments, and planned altitude information. The flight plan information may optionally include various limits, such as altitude floors, altitude ceilings, and/or exclusion regions or zones. In some embodiments, the flight plan may be dynamically adjusted during flight based upon crew input, based upon current location of the aircraft 102 as provided by the GPS 204 and/or the IMU 208, and/or based upon instructions or information received by the transceiver 206.

The vertical display processing module 230 retrieves weather information, and more particularly the location of any identified regions of airspace 108 potentially having type I ice crystals 110, along a predefined or selected vertical plane, such as the vertical slice 130 (FIG. 1). The vertical slice weather information is communicated to the display system 214, which displays an image corresponding to the vertical slice 130 showing the location and the altitude of any identified regions of airspace 108 potentially having type I ice crystals 110.

The type I ice crystals detecting module 232 accesses the weather information provided by the onboard weather radar system 210, namely the radar return intensity information and the associated location information, and identifies region of airspace 108 potentially having type I ice crystals 110 have been detected. Thus, the type I ice crystals detecting module 232 identifies regions of airspace exhibiting low values of radar return intensities, and based upon other weather conditions and/or aircraft conditions, determines if the identified airspace is likely to contain type I ice crystals 110.

Information pertaining to the various weather condition and/or aircraft condition thresholds is stored in the conditions database 236. Information about the various conditions may be predefined or may be selectably specified by the crew of the aircraft 102 via input provided via the crew interface 218. For example, but not limited to, the crew may adjust the maximum range threshold 114 and/or the minimum range threshold 116 by providing suitable inputs to the crew interface 218.

Once a region of airspace 108 potentially having type I ice crystals 110 is identified, then information pertaining to the identified region of airspace 108 potentially having type I ice crystals 110 is communicated to the type I ice crystals airspace region notification module 234. The type I ice crystals airspace region notification module 234 determines how the information is presented to the crew of the aircraft 102.

In some situations, an audible notification, warning, alarm or the like is issued to the crew. Accordingly, the type I ice crystals airspace region notification module 234 generates information that causes communication of sound-based information to an audio system (not shown) that emits the audible notification, warning, alarm or the like.

Additionally, or alternatively, the presented images on the display 222 of the display system 214 are modified to indicate the presence of the region of airspace 108 potentially having type I ice crystals 110. Accordingly, the type I ice crystals airspace region notification module 234 communicates graphics-based information that is used to modify images of detected weather that is presented on the display 222.

Figure 3:
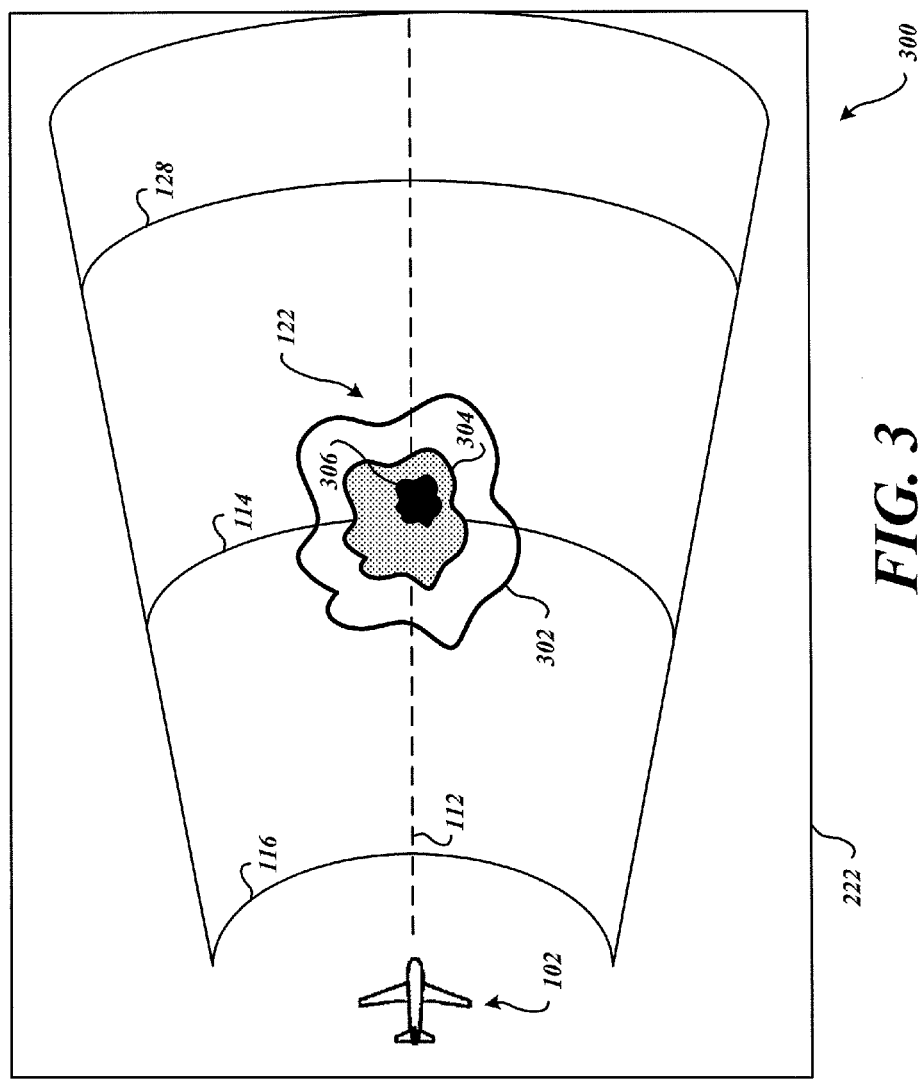
FIG. 3 is a display image presenting a plan view of the planned flight path through the region of airspace having convective weather prior to detection of the region of airspace 108 potentially having type I ice crystals.
Figure 4:
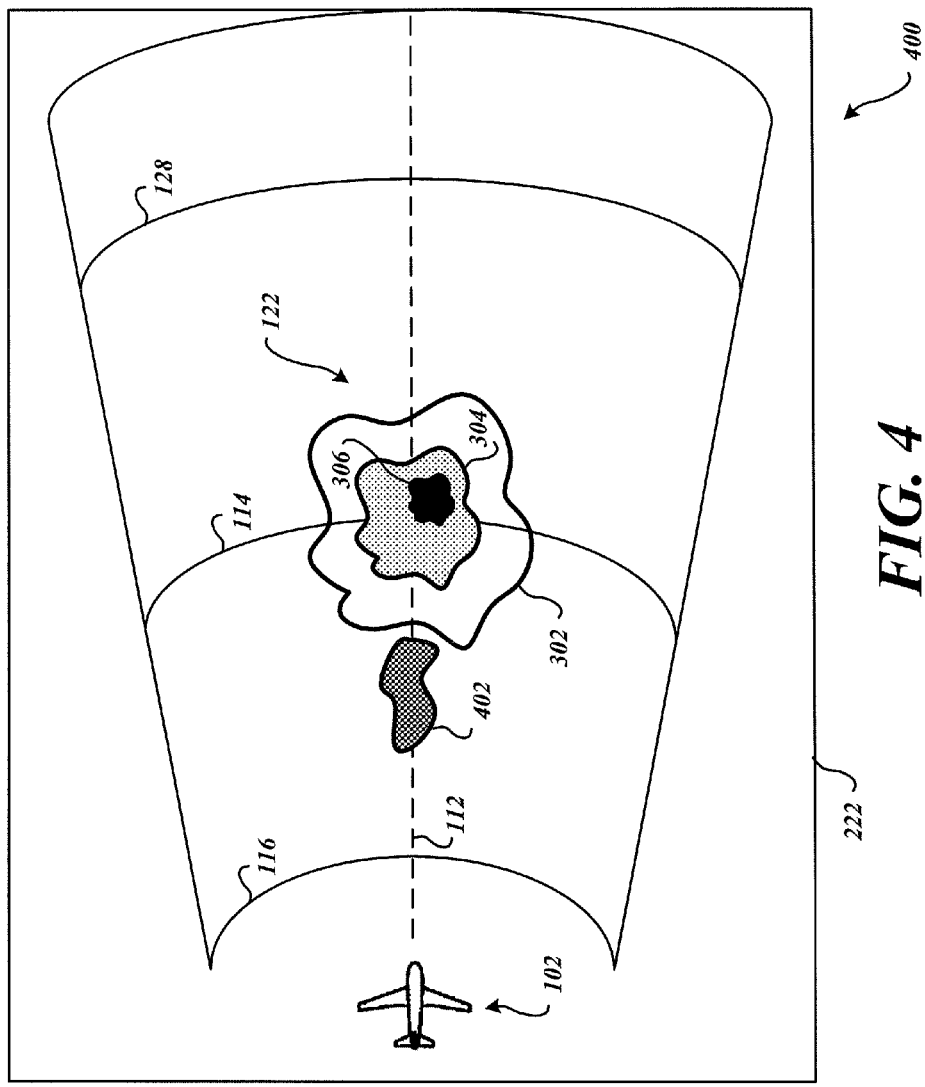
FIG. 4 is a display image presenting a plan view of the planned flight path through the region of airspace having convective weather after to detection of the region of airspace potentially having type I ice crystals.

FIG. 3 is a display image 300 presenting a plan view of the planned flight path 112 through the region of airspace 104 having convective weather 122 prior to detection of the region of airspace 108 potentially having type I ice crystals 110. FIG. 4 is a display image 400 presenting a plan view of the planned flight path 112 through the region of airspace 104 having convective weather 122 after to detection of the region of airspace 108 potentially having type I ice crystals 110.

The plan views 300 and 400 display the graphical information, such as icons or the like, indicating the location of the convective weather 122. Similar to FIG. 1, reference numerals of the icons of FIGS. 3 and 4 correspond to the reference numerals of the convective weather 122 and/or the region of airspace 108 potentially having type I ice crystals 110 of FIG. 1 for convenience.

In the exemplary plan views 300 and 400, the extent of the convective weather 122 is indicated by the bold outlined graphical region 302. Various levels of severity of the convective weather 122 may be indicated using graphical information presented on the display 222. In the simplified plan views 300 and 400, less severe weather is indicated using a white background, such as noted in the periphery area bounded by the outlined graphical region 302. Moderately severe weather is indicated using a shaded background, such as noted in the shaded periphery area bounded by the outlined graphical region 304. Very severe weather is indicated using a black background, such as noted in the black periphery area bounded by the outlined graphical region 306. Thus, the crew of the aircraft 102 appreciate that the planned flight path 112 will traverse through the convective weather 122. Further, the plan views 300 and 400 indicate that if the very severe weather region is at the same altitude of the aircraft 102, that the aircraft will traverse through this very severe weather region of the convective weather 122. (Some onboard weather radar systems 210 are configured to present a vertical slice view which indicates the altitude of various portions of the convective weather 122 along a selected vertical slice 130 illustrated in FIG. 1.)

The simplified plan views 300 and 400 indicate the graphical regions 302, 304, 306 using different shading. In practice these graphical regions 302, 304, 306 corresponding to differing levels of weather severity would be presented on the display 222 using different colors. For example, the less severe weather regions may be indicated using a white color. Moderately severe weather regions may be indicated using a yellow color, wherein the yellow color indicates an alert condition to the crew. Very severe weather regions may be indicated using a red color, wherein the red color indicates a warning condition to the crew. Accordingly, the crew may choose to modify their planned flight path 112 so as to avoid the airspace regions indicating severe and/or moderate weather conditions. Other onboard weather radar systems 210 may use different graphics to indicate weather, such as by using different colors or the like to indicate differing levels of weather severity.

In the simplified plan view 300, the region of airspace 108 potentially having type I ice crystals 110 is not indicated. However, as some point, the onboard weather radar system 210 will detect low level radar returns that may be associated with type I ice crystals 110. If at least one other weather condition and/or flight condition is also met, then the type I ice crystal display system 100 may identify the region of airspace 108 as potentially having type I ice crystals 110. Upon the identification of the region of airspace 108 potentially having type I ice crystals 110, embodiments then take actions to advise the crew of the aircraft 102 of the detection of the region of airspace 108 potentially having type I ice crystals 110. As noted above, embodiments may issue an audible advisory or warning to the crew of the aircraft 102.

Alternatively, or additionally, the detected region of airspace 108 potentially having type I ice crystals 110 may be indicated on the display 222. To illustrate, the simplified plan view 400 shows a graphical region 402 which corresponds to the detected region of airspace 108 potentially having type I ice crystals 110. The graphical region 402 is illustrated as a cross-hatched area so as to differentiate from the regions corresponding to the detected convective weather 122. Accordingly, after the presented images on the display 22 changed from the plan view 300 of FIG. 3 to the plan view 400 of FIG. 4, the crew of the aircraft 102 will appreciate the existence of the region of airspace 108 potentially having type I ice crystals 110. The crew may then choose to fly through the region of airspace 108 potentially having type I ice crystals 110, or the crew may choose to modify their planned flight path so as to avoid the region of airspace 108 potentially having type I ice crystals 110.

In an example embodiment, the graphical region 402 corresponding to the region of airspace 108 potentially having type I ice crystals 110 would be presented on the display 222 using a blue, or substantially blue, color. Accordingly, the crew will readily appreciate the nature of the weather (the region of airspace 108 potentially having type I ice crystals 110) associated with the presented graphical region 402, and will readily appreciate the differences from the presented graphical regions 302, 304, 306.

Alternatively, or additionally, the color and/or intensity of the presented graphical region 402 may varied to indicate the severity, and/or the level of risk, associated with the type I ice crystals 110. For example, but not limited to, if the concentration of type I ice crystals 110 in the region of airspace 108 is relatively high, the graphical region 402 may be presented using a very brilliant color, such as, but not limited to, a brilliant blue color. Conversely, if the concentration of type I ice crystals 110 in the region of airspace 108 is relatively low, the graphical region 402 may be presented using a relatively pale color, such as, but not limited to, a pale blue color. The color intensity may be slidably adjusted so as to be able to indicate different levels of severity. In some embodiments, different colors may be used to indicate different levels of severity of the if the amount of type I ice crystals 110 in the region of airspace 108.

Concentration of type I ice crystals 110 may be determined based on the signal strength of the received radar signal returns. A higher radar reflectivity signal strength return corresponds to a higher concentration of type I ice crystals 110. Further, the range of the region of airspace 108 may be additionally considered. For example, reflectivity signal strength returns of a particular level originating from a closer region of airspace 108 corresponds to a higher concentration of type I ice crystals 110. In some embodiment, the weight of significance of radar reflectivity signal strength returns and/or ranges may be slidably adjusted so as to be able to indicate different concentrations of type I ice crystals 110. In some embodiments, different concentrations may be used to indicate different levels of severity of the if the amount of type I ice crystals 110 in the region of airspace 108

Alternatively, or additionally, the graphical region 402 may be indicated in a flashing manner. That is, the graphical region 402 would be repetitively presented for a brief first duration, and then not displayed for a second duration. For example, the graphical region 402 may be presented every other second on the display 222. Further, frequency of the flashing of the graphical region 402 may indicate the severity, and/or the level of risk, associated with the type I ice crystals 110. For example, but not limited to, if the concentration of type I ice crystals 110 in the region of airspace 108 is relatively high, the graphical region 402 may be flashed at a faster rate. Conversely, if the concentration of type I ice crystals 110 in the region of airspace 108 is relatively low, the graphical region 402 may be flashed at a slower rate. The flashing rate may be slidably adjusted so as to be able to indicate different levels of severity.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of detecting type I ice crystals using an onboard weather radar system of an aircraft, the method comprising:
   identifying radar returns having a return level signal strength less than a radar return sensitivity threshold level;
   determining if at least one of a weather condition or a flight condition concurrently exists with the identified radar returns having the return level signal strength less than the radar return sensitivity threshold level; and
   identifying a region of airspace potentially having type I ice crystals when the at least one of the weather condition or the flight condition concurrently exists with the identified radar returns having the return level signal strength less than the radar return sensitivity threshold level.

2. The method of claim 1, further comprising:
   displaying on a display information identifying the region of airspace potentially having type I ice crystals in response to identifying the region of airspace potentially having type I ice crystals,
   wherein the weather condition comprises an ambient temperature being between −5° C. to −55° C.

3. The method of claim 1, wherein the at least one of the weather condition or the flight condition is an altitude of the aircraft, and wherein the determining further comprises:
   comparing the altitude of the aircraft with an altitude threshold,
   wherein the at least one of the weather condition or the flight condition is determined to concurrently exist with the identified radar returns having the return level signal strength less than the radar return sensitivity threshold level when the altitude of the aircraft is greater than or equal to the altitude threshold.

4. The method of claim 3, further comprising:
   determining a range of the aircraft from the identified region of airspace potentially having type I ice crystals; and
   comparing the range of the aircraft from the identified region of airspace potentially having type I ice crystals with a maximum range threshold,
   wherein the at least one of the weather condition or the flight condition is determined to concurrently exist with the identified radar returns having the return level signal strength less than the radar return sensitivity threshold level when the range of the aircraft from the identified region of airspace potentially having type I ice crystals is less than the maximum range threshold.

5. The method of claim 3, further comprising:
   determining a range of the aircraft from the identified region of airspace potentially having type I ice crystals; and
   comparing the range of the aircraft from the identified region of airspace potentially having type I ice crystals with a minimum range threshold,
   wherein the at least one of the weather condition or the flight condition is determined to concurrently exist with the identified radar returns having the return level signal strength less than the radar return sensitivity threshold level when the range of the aircraft from the identified region of airspace potentially having type I ice crystals is greater than the minimum range threshold.

6. The method of claim 1, wherein the at least one of the weather condition or the flight condition is an altitude of the identified region of airspace potentially having type I ice crystals, and wherein the determining further comprises:
   comparing the altitude of the identified region of airspace potentially having type I ice crystals with a type I ice crystal altitude threshold,
   wherein the at least one of the weather condition or the flight condition is determined to concurrently exist with the identified radar returns having the return level signal strength less than the radar return sensitivity threshold level when the altitude of the identified region of airspace potentially having type I ice crystals is greater than or equal to the type I ice crystal altitude threshold.

7. The method of claim 1, wherein the at least one of the weather condition or the flight condition is a vertically integrated liquid-water (VIL) content value of a volume of airspace, and wherein the determining further comprises:
   comparing the VIL content value of the volume of airspace with a VIL content value threshold,
   wherein the at least one of the weather condition or the flight condition is determined to concurrently exist with the identified radar returns having the return level signal strength less than the radar return sensitivity threshold level when the altitude of the identified region of airspace potentially having type I ice crystals is greater than or equal to the type I ice crystal altitude threshold.

8. The method of claim 7, further comprising:
   comparing a range of the volume of airspace with the VIL content value at least equal to the VIL content value threshold with a VIL content range threshold,
   wherein the at least one of the weather condition or the flight condition is determined to concurrently exist with the identified radar returns having the return level signal strength less than the radar return sensitivity threshold level when the range of the volume of airspace with the VIL content value at least equal to the VIL content value threshold is less than the VIL content range threshold.

9. The method of claim 1, wherein the at least one of the weather condition or the flight condition is an estimated temperature for at least one of a location of or an altitude of the region of airspace potentially having type I ice crystals, and wherein the determining further comprises:
   comparing the estimated temperature outside of the aircraft with an ambient temperature threshold,
   wherein the at least one of the weather condition or the flight condition is determined to concurrently exist with the identified radar returns having the return level signal strength less than the radar return sensitivity threshold level when the ambient temperature outside of the aircraft is less than or equal to the ambient temperature threshold.

10. The method of claim 1, wherein the at least one of the weather condition or the flight condition is an ambient temperature outside of the aircraft, and wherein the determining further comprises:
comparing the ambient temperature outside of the aircraft with an ambient temperature threshold,
wherein the at least one of the weather condition or the flight condition is determined to concurrently exist with the identified radar returns having the return level signal strength less than the radar return sensitivity threshold level when the ambient temperature outside of the aircraft is less than or equal to the ambient temperature threshold.

11. The method of claim 10, further comprising:
determining a range of the aircraft from a location of the identified region of airspace potentially having type I ice crystals; and
comparing the range of the aircraft from the identified region of airspace potentially having type I ice crystals with a maximum range threshold,
wherein the at least one of the weather condition or the flight condition is determined to concurrently exist with the identified radar returns having the return level signal strength less than the radar return sensitivity threshold level when the range of the aircraft from the identified region of airspace potentially having type I ice crystals is less than the maximum range threshold.

12. The method of claim 10, further comprising:
determining a range of the aircraft from a location of the identified region of airspace potentially having type I ice crystals; and
comparing the range of the aircraft from the identified region of airspace potentially having type I ice crystals with a minimum range threshold,
wherein the at least one of the weather condition or the flight condition is determined to concurrently exist with the identified radar returns having the return level signal strength less than the radar return sensitivity threshold level when the range of the aircraft from the identified region of airspace potentially having type I ice crystals is greater than the minimum range threshold.

13. The method of claim 1, wherein the at least one of the weather condition or the flight condition is a size of convective weather detected by an onboard radar system of the aircraft, and wherein the determining further comprises:
comparing the size of the convective weather with a convective weather size threshold,
wherein the at least one of the weather condition or the flight condition is determined to concurrently exist with the identified radar returns having the return level signal strength less than the radar return sensitivity threshold level when the size of the convective weather is less than or equal to the convective weather size threshold.

14. The method of claim 13, further comprising:
determining a range of the aircraft from a location of the convective weather; and
comparing the range of the aircraft from the location of the convective weather with a convective weather proximity threshold,
wherein the at least one of the weather condition or the flight condition is determined to concurrently exist with the identified radar returns having the return level signal strength less than the radar return sensitivity threshold level when the range of the aircraft from the location of the convective weather is less than the convective weather proximity threshold.

15. The method of claim 1, wherein determining if at least one of a weather condition or a flight condition concurrently exists with the identified radar returns having the return level signal strength less than the radar return sensitivity threshold level comprises determining if both the weather condition and the flight condition concurrently exist with the identified radar returns having the return level signal strength less than the radar return sensitivity threshold level.

16. A system onboard an aircraft, comprising:
an onboard radar system configured to receive radar returns from weather in proximity to the aircraft;
a display system configured to display information corresponding to the received radar returns; and
a processing system communicatively coupled to the onboard radar system and the display system, and configured to:
identify radar returns having a return level signal strength less than a radar return sensitivity threshold level;
determine if at least one of a weather condition or a flight condition concurrently exists with the identified radar returns having the return level signal strength less than the radar return sensitivity threshold level; and
identify a region of airspace potentially having type I ice crystals when the at least one of the weather condition or the flight condition concurrently exists with the identified radar returns having the return level signal strength less than the radar return sensitivity threshold level,
wherein the region of airspace potentially having type I ice crystals is displayed on the display.

17. The system of claim 16, wherein the at least one of the weather condition or the flight condition is an altitude of the aircraft, and wherein the processing system is further configured to:
compare the altitude of the aircraft with an altitude threshold,
wherein the at least one of the weather condition or the flight condition is determined to concurrently exist with the identified radar returns having the return level signal strength less than the radar return sensitivity threshold level when the altitude of the aircraft is less than or to the altitude threshold.

18. The system of claim 16, wherein the at least one of the weather condition or the flight condition is an altitude of the identified region of airspace potentially having type I ice crystals, and wherein the processing system is further configured to:
compare the altitude of the identified region of airspace potentially having type I ice crystals with a type I ice crystal altitude threshold,
wherein the at least one of the weather condition or the flight condition is determined to concurrently exist with the identified radar returns having the return level signal strength less than the radar return sensitivity threshold level when the altitude of the identified region of airspace potentially having type I ice crystals is greater than or equal to the type I ice crystal altitude threshold.

19. The system of claim 16, wherein the at least one of the weather condition or the flight condition is an ambient temperature outside of the aircraft, and wherein the processing system is further configured to:
compare the ambient temperature outside of the aircraft with an ambient temperature threshold,
wherein the at least one of the weather condition and the flight condition is determined to concurrently exist with the identified radar returns having the return level signal strength less than the radar return sensitivity threshold level when the ambient temperature outside of the aircraft is less than to the ambient temperature threshold.

20. A method of detecting type I ice crystals using an onboard weather radar system of an aircraft, the method comprising:

receiving radar returns at the onboard weather radar system;

identifying radar returns having a return level signal strength less than a radar return sensitivity threshold level;

comparing at least one of a weather condition or a flight condition with a corresponding threshold, wherein the at least one of the weather condition or the flight condition is at least one of:

an altitude of the aircraft, wherein the threshold is an altitude threshold;

an altitude of the identified region of airspace potentially having type I ice crystals, wherein the threshold is a type I ice crystal altitude threshold;

a first range of the aircraft from a location of convective weather, wherein the threshold is a first range threshold;

a second range of the aircraft from a location of the radar returns having the return level signal strength less than the radar return sensitivity threshold level, wherein the threshold is a second range threshold;

an ambient temperature outside of the aircraft, wherein the threshold is an ambient temperature threshold; or a vertically integrated liquid-water (VIL) content value of a volume of airspace associated with the radar returns having the return level signal strength less than the radar return sensitivity threshold level wherein the threshold is a VIL content value threshold; determining if the at least one of the weather condition or the flight condition concurrently exists with the identified radar returns having the return level signal strength less than the radar return sensitivity threshold level; and identifying a region of airspace as having type I ice crystals when the at least one of the weather condition or the flight condition concurrently exists with the identified radar returns having the return level signal strength less than the radar return sensitivity threshold level, wherein the type I ice crystals are found when the ambient temperature is between $-5°$ c. to $-55°$ C.

* * * * *

UNITED STATES PATENT AND TRADEMARK OFFICE
CERTIFICATE OF CORRECTION

PATENT NO.         : 9,188,700 B2
APPLICATION NO.    : 13/535230
DATED              : November 17, 2015
INVENTOR(S)        : Brian P. Bunch et al.

It is certified that error appears in the above-identified patent and that said Letters Patent is hereby corrected as shown below:

Claims

Column 22, Claim 20, Line 23: "…between -5° c. to…" should be changed to
-- …between -5° C. to… --

Signed and Sealed this
Sixteenth Day of August, 2016

Michelle K. Lee
*Director of the United States Patent and Trademark Office*